United States Patent Office 2,890,316
Patented June 9, 1959

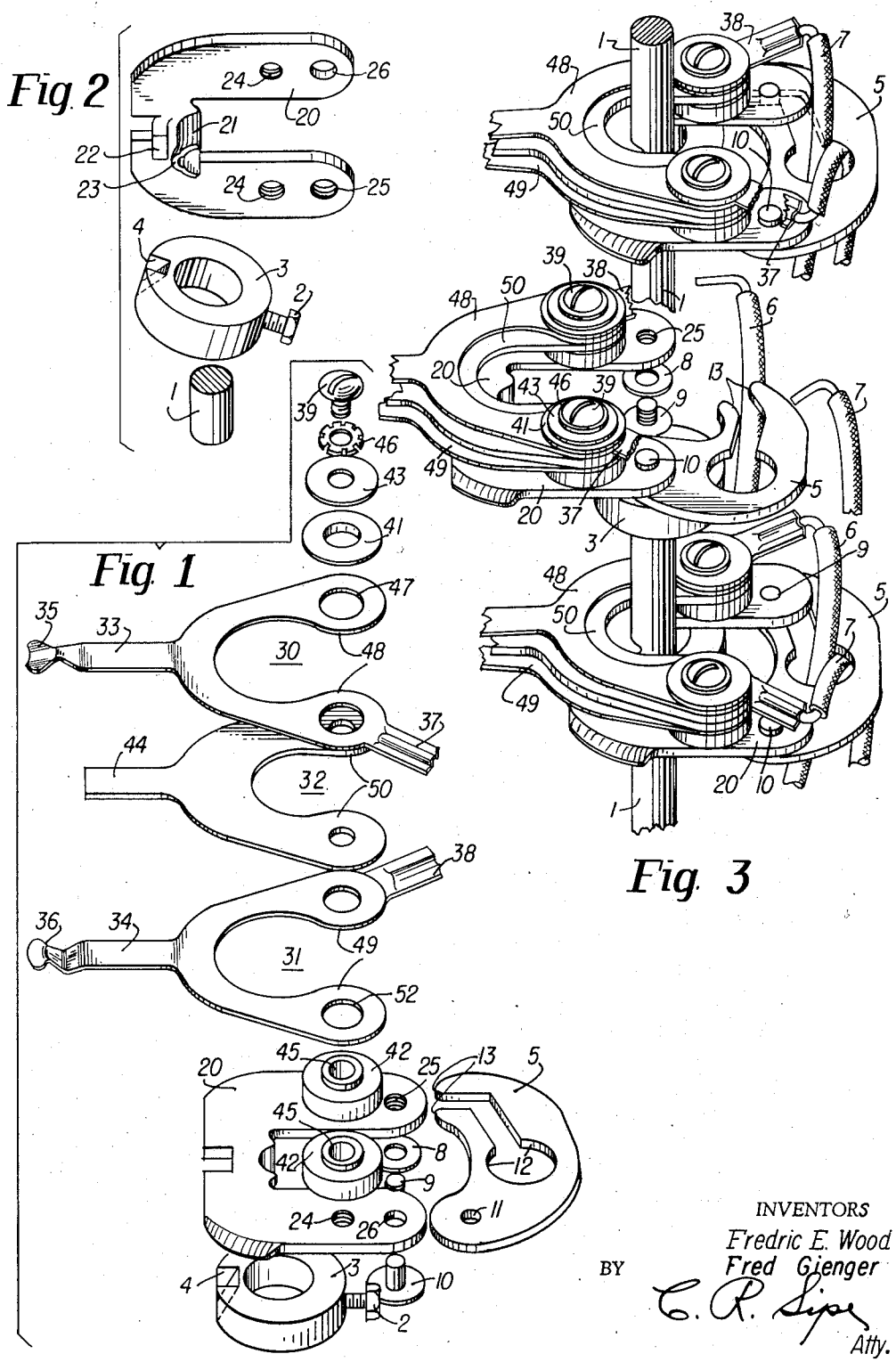

2,890,316

DETACHABLE WIPER ASSEMBLY FOR STEPPING SWITCHES

Fred Gienger, Highland Park, and Fredric E. Wood, McHenry, Ill., assignors to General Telephone Laboratories, Incorporated, Northlake, Ill., a corporation of Delaware Application June 2, 1958, Serial No. 739,078

14 Claims. (Cl. 200—166)

This invention relates to electrical switching devices and particularly to improvements in switches used for the establishment of connections between subscribers' lines in automatic telephone systems.

The object of this invention is to simplify and improve certain parts of automatic switching devices and to facilitate the assembling and replacing of such parts.

The main object of the invention is the provision of a wiper assembly whose parts are simple and having new and novel features which simplify manipulating, dismounting of wipers at any point along the shaft without necessitating the removal of wipers above or below the wiper intended to be replaced.

According to one of the features of the invention is the provision of a detachable wiper assembly having a wiper carrying U-shaped member with an upright lug positioned between the shaft and wiper hub and a set screw in the hub for holding the hub and member to the shaft, and for permitting detachment of the member and its wipers from the hub and shaft.

Another feature of the invention resides in the coupling means for detachably securing a wiper assembly in the manner above presented including a tongue and groove arrangement between the lug and the hub to prevent independent rotation of these parts during rotation of the shaft.

Another feature of the invention in combination with the above mentioned features resides in a neb at the extreme end of said lug to prevent longitudinal dislodgments of the wiper assembly during vertical and rotary movement of the shaft.

Other objects, features and advantages of the present invention will become apparent from a perusal of the following specification taken in combination with the accompanying drawings in which:

Fig. 1 shows an exploded view of a wiper spring assembly, including a hub for securing the assembly to a shaft.

Fig. 2 shows a perspective view of the wiper assembly detachable securing means.

Fig. 3 shows a perspective view of a plurality of detachable wiper assemblies secured to the shaft, including one detached wiper assembly.

Referring to Fig. 1, there is shown a complete wiper assembly in an exploded view in vertical alignment in which the component parts will be secured together. A "U-shaped" metallic plate 20 comprises the base for the wiper assembly, as well as the link for detachably securing the wiper assembly to the shaft 1.

Referring first to the wiper assembly itself as shown in Fig. 1, a pair of wipers 30 and 31 made of any desirable electrical conductive material and having substantially U-shaped portions 48 and 49, are separated by an insulator 32 having a substantially U-shaped portion 50. The upper wiper 30 has an arm 33 extending outward and forming a "V-shaped" wiper tip 35, and, similarly, wiper 31 has a lower arm 34 extending outward forming a "V-shaped" wiper tip 36. The wipers when assembled are pretensioned at the wiper tips toward each other. The wiper insulator 32 also has an arm 44 extending outward a short distance coextensive with the arms 33 and 34 to form an electrical insulation therebetween. A pair of insulator washers 42, one for each end of the "U-shaped" portions of the wiper assembly are utilized to separate the bottom wiper 31 from the plate 20. At the outer extensions of the wipers and the wiper insulator 32, are holes such as 47 for accepting screws, such as 39. For co-operation therewith are non-conductive or insulator washers 41 which rest upon the upper wiper 30, metallic washers 43 and lock washers 46. A tubular projection 45 on each washer 42 is adapted to be inserted in screw holes 52 in wiper 31 to insulate the wiper 31 from the screws 39. Insulator washers 41 also have tubular projections thereon, although not shown, for being inserted in screw holes 47 to insulate wiper 30 from the screws 39. The plate 20 has a pair of threaded holes 24, for tightening the screws 39 therein after inserting the screws through lock washers 46, metal washers 43, insulator washers 41 etc.

The "U-shaped" plate 20 at the inner intersection of its extending arms, has a lug projection 21 (Fig. 2) integral with and perpendicularly disposed relative to said plate. The lug 21 is semi-cylindrical in shape having an inner arc substantially the same as the circumference of shaft 1, and at its outer extremity has a neb 23 integral with and substantially perpendicular with lug 21. Enveloping the shaft 1 is a hub 3, having an inner circumference with a diameter larger than the diameter of the shaft to provide clearance for the lug 21 therebetween. By means of a set screw 2 in the hub 3, the wiper assembly, and more specifically the lug 21 is removably secured to the shaft 1. The distance along the outer edge of lug 21 between the plate 20 and the neb 23 is slightly longer than the thickness of hub 3, to permit a portion of the inner thickness of hub 3 to rest therebetween. The plate 20 at the outer intersection of its extending arms, has an integral projection or tongue 22 perpendicularly disposed therefrom. For co-operation with the tongue 22 there is provided a groove 4 in the hub 3 to combine in a tongue and groove interconnecting arrangement.

Due to the "U-shaped" feature of the wiper assembly, the assembly can be inserted or retracted from the shaft 1 through its open ends, as shown in Figs. 2 and 3. In attaching the wiper assembly to the shaft, the set screw 2 in hub 3 must be screwed outward from the shaft to permit the lug 21 of plate 20 to be inserted between the shaft 1 and the hub 3. After such insertion, the neb 3 engages the underside of hub 3 and the plate 20 will overlap a portion of the top of hub 3; the tongue 22 of plate 20 will interconnect within groove 4 of hub 3. After these last two manual operations, the set screw 2 will be tightened whereby it will engage shaft 1 and squeeze the lug 21 tightly between the shaft and the hub. The neb 23 will prevent longitudinal dislodgment of the wiper assembly, and the tongue and groove interlocking arrangement will prevent any rotary dislodgment after the wiper assembly has been secured to the shaft.

At one of the outer extremities of plate 20 is a threaded hole 25, and at the other extremity is a rivet hole 26 for securing a rotatable cord holder 5 thereto, by means of a screw 25 and a rivet 10 respectively. The cord holder 5 is made of any suitable insulating material, and comprises a rivet hole 11 and a key hole slot 12. The rivet hole 11 and rivet hole 26 of plate 20 and holder 5 are aligned, with holder 5 under plate 20, for inserting rivet 10 therethrough and fastened in any well-known manner. This permits the cord holder 5 to rotate a limited distance on the rivet 10. The threaded hole 25 permits the insertion of a screw 9 including a washer 8 enveloping the screw. At the exit 13 of key hole slot 12, the cord holder 5 is inserted between washer 8 and the bottom of plate 20 to squeeze the holder 5 therebetween upon tightening the screw 9. Thus, the cord holder 5 is rotatably secured to the plate 20 by rivet 10, and the plate 20 and the cord holder 5 comprise a closed circular detachable unit around the shaft 1. This unit is detachable in the manner shown in the middle wiper assembly of Fig. 3. In other words, by means of the rotatable cord holders, the wiper assemblies, after disengaging hub 3 from the plate 20, can be detached merely by loosening screw 9 and rotating the cord holder 5 to the position shown in Fig. 3.

The key hole slot 12 of cord holder 5 permits the insertion of a pair of cords 6 and 7 therethrough for soldering the extremities thereof to the soldering terminals 37 and 38 of wipers 30 and 31 respectively. Thus, when detaching a wiper assembly; the cords 6 and 7 are removed from their respective soldering terminals; the cord holder 5 is rotated away from its fastening means; the set screw 2 is loosened to permit the hub 3 to be disengaged from plate 20; and the wiper assembly is removed from around the shaft and hub 3 through the open ends of the U-shaped portions thereof.

It thus becomes apparent that any wiper assembly may be readily detached from the shaft for replacement due to worn parts after extensive usage, by virtue of the arrangement disclosed without necessitating the removal from said shaft of any other wiper. It will also be appreciated that these wiper assemblies do not decrease the stability during switch operation. In fact, there is practically no vibration during vertical stepping, and the interlocking arrangement between the wiper assembly and the hub 3 permits the two units to rotate as a single unit. The amplitude of vibration is so small that the duration, amplitude and natural frequency cannot be determined.

It will readily be appreciated by those skilled in the art that wiper assemblies embodying the improvement disclosed herein will lend operating, installation, and maintenance advantages to the switches to which they are applied.

What is claimed is:

1. In a stepping switch including a shaft, a hub encircling said shaft for coupling a detachable wiper assembly thereto, said wiper assembly comprising a U-shaped plate, two electrically conductive resilient wiper arms insulatedly attached to said plate, a lug extension integral with and perpendicularly disposed from said plate, a set screw in said hub adapted to fasten and squeeze said lug between said hub and shaft whereby said wiper assembly lies in a fixed position partially enveloping said shaft.

2. In a stepping switch including a shaft, a wiper assembly removably attached to said shaft, a hub on said shaft, said wiper assembly including a U-shaped plate and two electrically conductive resilient wiper arms, said wiper arms insulatedly attached to said plate; a coupling means including said hub, a set screw in said hub, and a lug integral with and perpendicularly disposed relative to said plate for securing said wiper assembly to said shaft; manually loosening said set screw enabling said hub to be removed from said lug and plate for detaching said wiper assembly from said shaft in a first direction, and means including the U-shaped openings of said plate and U-shaped openings in each wiper arm for permitting the complete detachment of said wiper assembly from said shaft in a second direction.

3. In a stepping switch including a shaft, a wiper assembly removably attached to said shaft, a hub on said shaft; said wiper assembly including a U-shaped plate, two electrically conductive resilient and relatively U-shaped wipers, a relatively U-shaped wiper insulator, and fastening means for fastening said assembly into a relatively U-shaped unit on said plate with said wipers being individually insulated; a coupling means including said hub, a set screw in said hub, and a lug integral with and perpendicularly disposed relative to said plate for securing said wiper assembly to said shaft; said coupling means securing said wiper assembly on said shaft by exerting pressure from said set screw against said shaft to move said hub and squeeze said lug against said shaft, said U-shaped wipers enabling removal of said plate without disengaging said plate from said shaft by manually removing said fastening means, and manually loosening of said set screw enabling said hub to be disengaged from said plate to permit removal of the entire wiper assembly unit from said shaft.

4. In a stepping switch including a shaft, a wiper assembly removably attached to said shaft, said wiper assembly including a plate and two electrically conductive resilient wiper arms, said wiper arms insulatedly attached to said plate and having free ends pretensioned to flex toward each other, a lug integral with and perpendicularly disposed relative to said plate for securing said wiper assembly to said shaft, and a coupling means including a tongue and groove arrangement and said lug interconnecting said wiper assembly to said shaft to permit unitary operation thereof.

5. In a stepping switch including a shaft, a wiper assembly removably attached to said shaft, said wiper assembly including a plate and two electrically conductive resilient wiper arms, a lug integral with and perpendicularly disposed relative to said plate for securing said wiper assembly to said shaft, a neb integral with and perpendicularly disposed relative to said lug, a coupling means including said lug and said neb interconnecting said wiper assembly to said shaft, and said neb restraining said wiper assembly to prevent longitudinal dislodgment between said wiper assembly and said coupling means.

6. In a stepping switch including a shaft, a wiper assembly removably attached to said shaft, said wiper assembly including a plate and two electrically conductive resilient wiper arms, a lug integral with and perpendicularly disposed relative to said plate for securing said wiper assembly to said shaft, a neb integral with and perpendicular to said lug, a tongue and groove means; a coupling means including said lug, said neb, and said tongue and groove means securing said wiper assembly to said shaft; said tongue and groove means preventing independent rotation of said wiper assembly and said shaft, and said neb restraining said wiper assembly to prevent longitudinal dislodgment between said wiper assembly and said coupling means.

7. In a stepping switch including a shaft, a wiper assembly removably attached to said shaft, a hub on said shaft, said wiper assembly including a plate and two electrically conductive resilient wiper arm, said wiper arms insulatedly attached to said plate and having free ends pretensioned to flex toward each other; a coupling means including said hub, a set screw in said hub, and a lug integral with and perpendicularly disposed relative to said plate for securing said wiper assembly to said shaft; said coupling means securing said wiper assembly on said shaft by exerting pressure from said set screw against said shaft to move said hub and squeeze said lug against said shaft, and manually loosening said set screw enabling said hub to be disengaged from said plate to allow removal and replacement of said wiper assembly from said shaft.

8. In a stepping switch as claimed in claim 7, including a tongue and groove means interconnecting said hub and said plate to prevent independent rotation of said hub and said wiper assembly.

9. In a stepping switch as claimed in claim 8, including restraining means comprising a neb integral with and perpendicular to said lug for securing said lug to said hub and preventing longitudinal dislodgment therebetween.

10. In a stepping switch including a shaft, a plurality of wiper assemblies removably attached in vertical alignment to said shaft, each wiper assembly including a U-shaped plate and two electrically conductive resilient wiper arms having U-shaped portions co-extensive with each of said plates insulatedly attached to its respective plate, a lug integral with and perpendicularly disposed relative to each plate for securing said wiper assemblies individually to said shaft, coupling means including one of said lugs individual to each wiper assembly for securing each wiper assembly to said shaft, said coupling means co-operatively disposed on said shaft to engage said lug at an intermediate location on said plate substantially intermediate said U-shaped portion to permit disengagement of individual wiper assemblies without removal of adjacent wiper assemblies.

11. In a stepping switch as claimed in claim 10, including a tongue and groove arrangement included in each of said coupling means to prevent independent rotation of any one of said wiper assemblies and said shaft.

12. In a stepping switch as claimed in claim 11, including a neb integral with and perpendicular to each lug to restrain each of said wiper assemblies to prevent longitudinal dislodgment between any one of said wiper assemblies and said shaft.

13. In a stepping switch including a shaft, a plurality of wiper assemblies removably attached in vertical alignment to said shaft, a plurality of hubs on said shaft, each wiper assembly including a plate and two electrically conductive resilient wiper arms, insulatedly attached to its respective plate; a coupling means associated with each assembly including one of said hubs, a set screw in each hub, and a lug integral with and perpendicularly disposed relative to each plate for securing said wiper assemblies individually to said shaft; said coupling means securing each wiper assembly on said shaft by exerting pressure from each set screw against said shaft to move each respective hub and squeeze the associated lug against said shaft, and each coupling means permitting removal of one of said wiper assemblies by disengaging its hub and set screw from its lug to allow replacement of said one wiper assembly without necessitating the removal of said other wiper assemblies.

14. In a stepping switch including a shaft, a plurality of wiper assemblies removably attached to said shaft, each of said wiper assemblies including a U-shaped plate, two relatively U-shaped wipers, and a relatively U-shaped wiper insulator, fastening means for fastening said two wipers and said wiper insulator of each wiper assembly into a relatively U-shaped unit on said plate, a lug integral with and perpendicularly disposed relative to each of said plates, coupling means including each of said lugs for securing each wiper assembly individually to said shaft, said fastening means of each wiper assembly and the U-shape of said wipers and said insulators permitting removal of any wiper or wiper insulator of any one wiper assembly, and each coupling means permitting removal of any one of said wiper assemblies without necessitating the removal of said remaining plurality of wiper assemblies.

References Cited in the file of this patent

UNITED STATES PATENTS

| | | |
|---|---|---|
| 1,900,236 | Hall | Mar. 7, 1933 |
| 2,259,103 | Drake | Oct. 14, 1941 |
| 2,457,588 | Miller | Dec. 28, 1948 |

FOREIGN PATENTS

| | | |
|---|---|---|
| 398,335 | Great Britain | Sept. 14, 1933 |